United States Patent
Fox et al.

[11] Patent Number: 5,219,144
[45] Date of Patent: Jun. 15, 1993

[54] MASS IMPACT DAMPER FOR ROTORS

[75] Inventors: Allen E. Fox; Steven A. Klusman; Timothy A. Nale, all of Indianapolis, Ind.

[73] Assignee: General Motors Corporation, Detroit, Mich.

[21] Appl. No.: 555,222

[22] Filed: Jul. 20, 1990

[51] Int. Cl.$^5$ .............................................. F16M 13/00
[52] U.S. Cl. ..................................... 248/562; 384/99; 384/448
[58] Field of Search ................ 464/180; 384/99, 448; 248/562, 560, 568, 603, 563; 188/378; 267/136, 140.1

[56] References Cited

U.S. PATENT DOCUMENTS

| | | | |
|---|---|---|---|
| 4,125,073 | 11/1978 | Bain | 101/216 |
| 4,556,130 | 12/1985 | Puszakowski | 188/218 |
| 4,872,767 | 10/1989 | Knapp | 384/99 |
| 4,921,229 | 5/1990 | Hori | 384/99 X |
| 5,056,935 | 10/1991 | Singh | 384/99 |

Primary Examiner—Ramon O. Ramirez
Attorney, Agent, or Firm—Saul Schwartz

[57] ABSTRACT

A vibration damper of a rotating shaft includes a floating housing attached to the shaft for radial vibratory displacement as a unit therewith, a plurality of cylindrical bores in the floating housing parallel to the axis of rotation of the shaft, and a plurality of smaller cylindrical impactors in the cylindrical bores. Each impactor is a metal sleeve having a smaller cylindrical tungsten rod therein with a damping medium around the rod. When the shaft experiences radial vibratory displacement, the sleeves impact the bores. When the sleeves impact the bores, the damping medium is squeezed from between the tungsten rods and the sleeves for vibration damping energy absorption in one mode. In addition, the tungsten rods impact the bores through the sleeves and initiate local plastic deformation of the bores the sleeves and the rods for energy absorption in another mode.

7 Claims, 3 Drawing Sheets

MASS IMPACT DAMPER FOR ROTORS

This invention was made in the course of work under a contract or subcontract of the United States Department of Defense.

FIELD OF THE INVENTION

This invention relates to shaft vibration dampers for application in extreme temperature environments which exceeds conventional damper capabilities, particularly gas turbine engines.

BACKGROUND OF THE INVENTION

In gas turbine engines, rotor shaft vibrations are commonly controlled by squeeze film dampers in which the damping medium is an oil film between fixed and floating housings of the damper. Applications for such dampers are limited to environments where ambient temperature around the damper does not exceed the maximum working temperature of the oil. A shaft vibration damper according to this invention is suitable for high temperature environment applications beyond the range of usual oil film squeeze film dampers. In addition, O-shaft vibration damper according to this invention is also suitable for cryogenic environments below the temperature capabilities of usual squeeze film dampers.

SUMMARY OF THE INVENTION

This invention is a new and improved shaft vibration damper including a floating housing on the rotating shaft, a plurality of chambers in the floating housing arrayed symmetrically around the axis of rotation of the shaft, and a plurality of impactors in respective ones of the chambers. Vibratory displacement of the shaft and floating housing induces impacts between the impactors and the corresponding chambers which impacts are accompanied by energy absorbing, local plastic deformation of the impactors and the chambers. In a preferred embodiment of the damper according to this invention, the chambers are cylindrical bores in the floating housing parallel to the axis of rotation of the shaft and the impactors are cylindrical sleeves each having a tungsten rod therein. The sleeves are sealed at opposite ends and filled with a damping medium around the tungsten rods which is liquid at damper operating temperature. The damping medium is squeezed from between the tungsten rods and the sleeves for additional energy absorption as the impactors engage the chambers.

DESCRIPTION OF A PREFERRED EMBODIMENT

Figure 1:
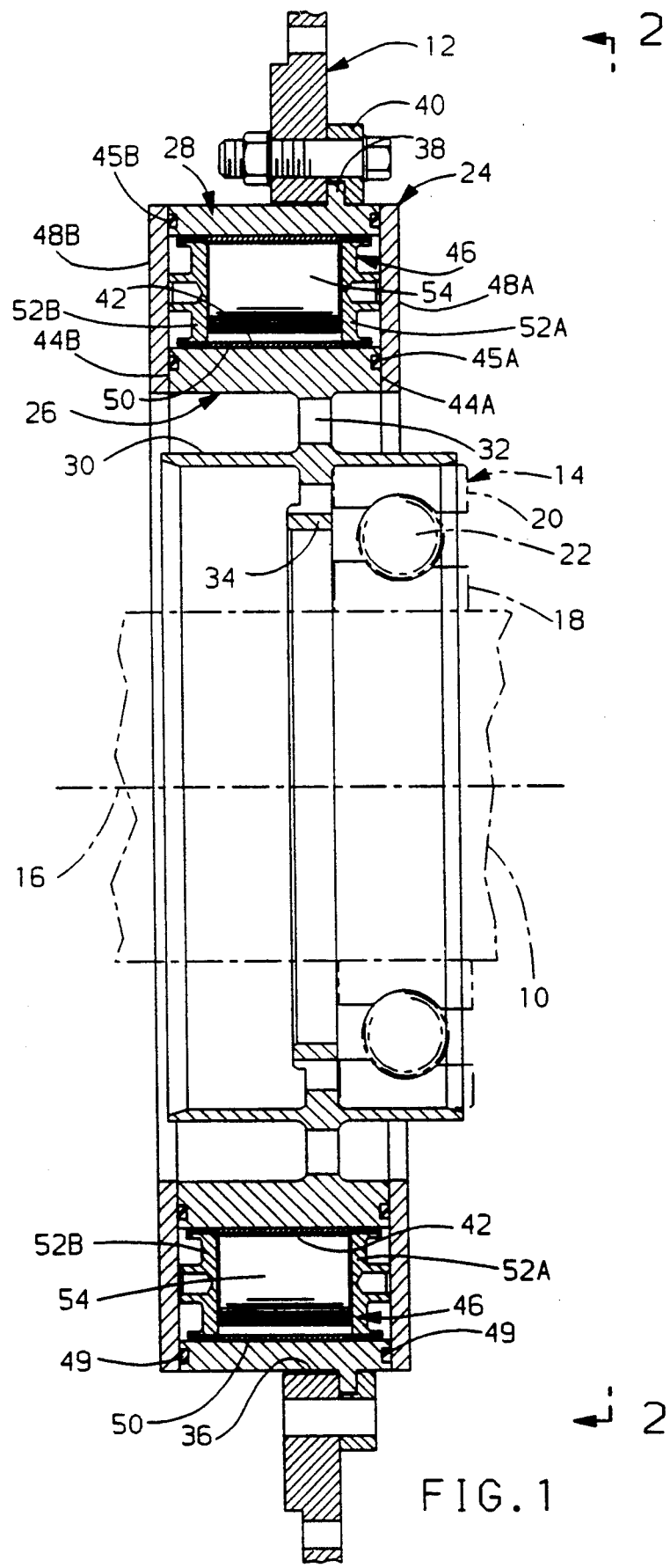
FIG. 1 is a longitudinal sectional view of a shaft vibration damper according to this invention.

Referring to FIG. 1, a schematically represented rotor shaft 10, such as a gas turbine engine turbine shaft, is supported on a relatively stationary structure 12, such as an engine casing, by a schematically represented bearing 14 for rotation about an axis 16. The bearing 14 includes an inner race 18 rotatable with the shaft 10, an outer race 20, and a plurality of rolling elements or bearing balls 22 between the inner and outer races. The centerline of shaft 10 normally coincides with axis 16. Dynamic unbalance, however, induces whirling, deflection of the shaft perpendicular to the axis 16 characterized herein as radial vibratory displacement. A vibration damper 24 according to this invention is interposed between the outer race 20 of the bearing 14 and the stationary structure 12 to control radial vibratory displacement.

The shaft vibration damper 24, constructed for laboratory rig testing, includes a floating housing 26 having an annular rim 28, a cylindrical center support 30, and a perforated radial web 32 between the rim and center support. The outer race 20 of the bearing 14 fits closely within the center support 30 and butts against an internal radial flange 34 of the center support. Bolts or other connecting devices, not shown, between the outer race 20 and the radial flange 34 rigidly connect the outer race to the floating housing 26.

The rim 28 is disposed in a circular aperture 36 in the stationary structure 12. An outer radial flange 38 on the rim 28 is captured by a retainer 40 bolted to the stationary structure. The retainer prevents movement of the floating housing 26 in the direction of axis 16. Radial clearance, however, between outer flange 38 and the retainer 40 affords the floating housing 26 freedom of movement in a plane perpendicular to axis 16. In a gas turbine engine application, for example, a resilient connection is required between the rim 28 and the stationary structure 12 which is both rigid enough for structural integrity and flexible enough to accommodate radial vibratory displacement of the shaft 10.

Figure 2:
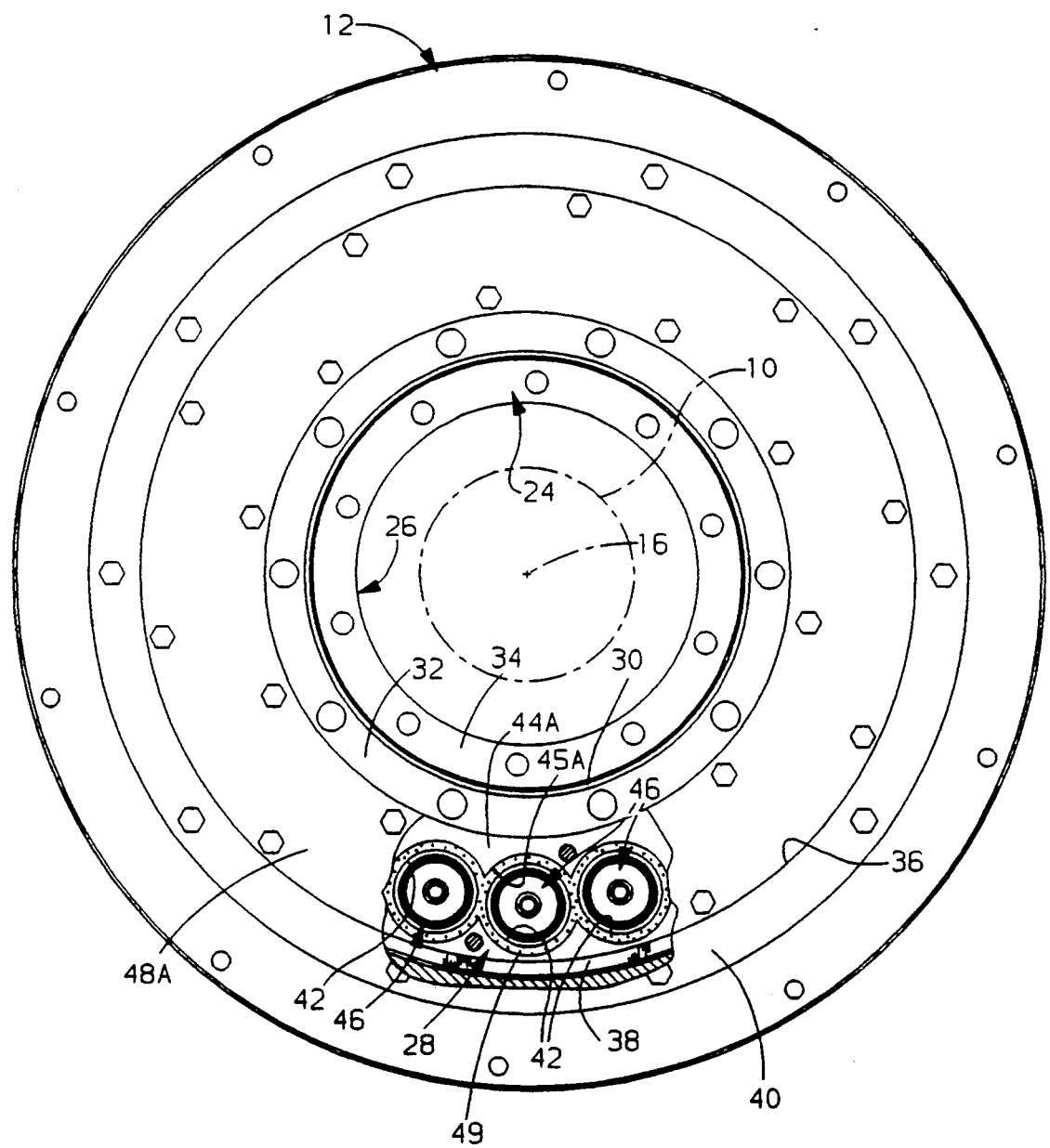
FIG. 2 is a partially broken-away view taken generally along the plane indicated by lines 2—2 in FIG. 1.
Figure 3:
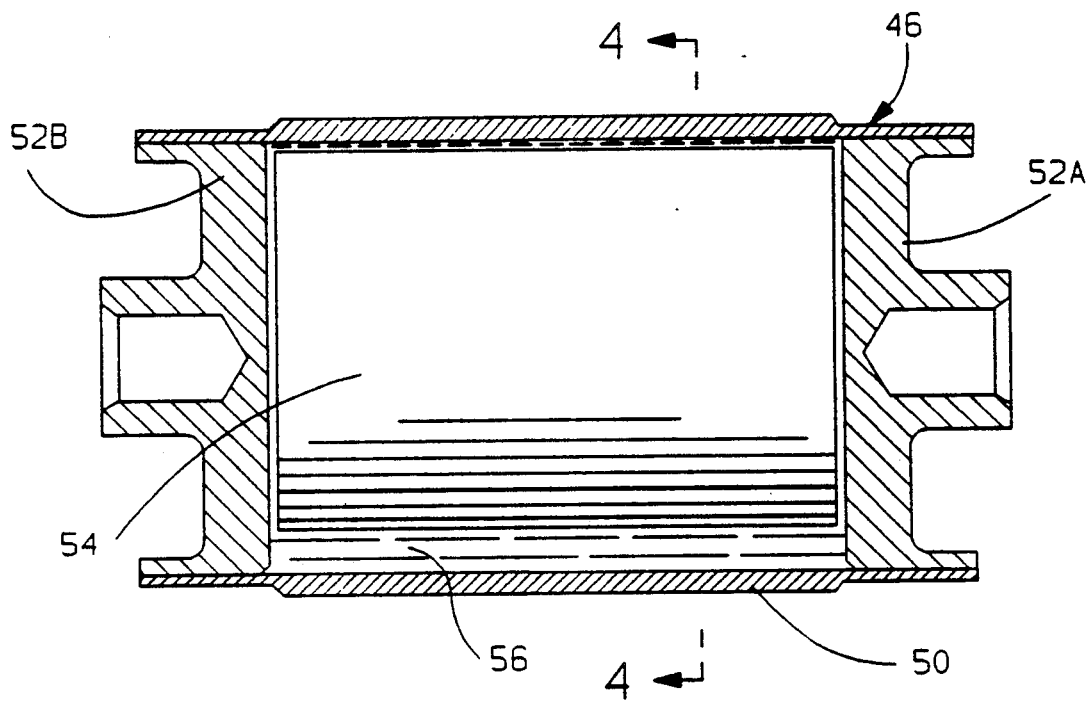
FIG. 3 is an enlarged view of a portion of FIG. 1.
Figure 4:
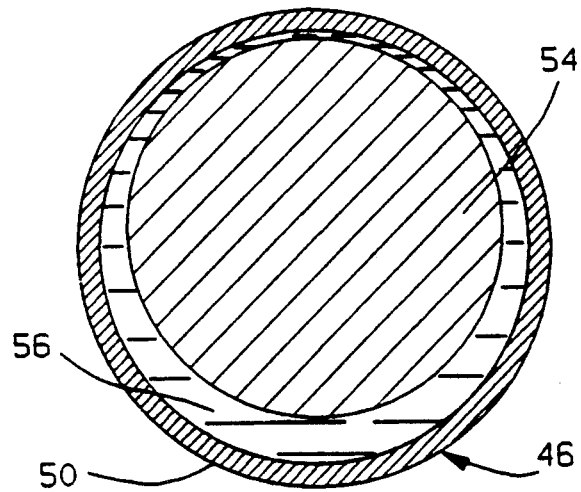
FIG. 4 is a sectional view taken generally along the plane indicated by lines 4—4 in FIG. 3.

As seen best in FIGS. 1-2, the floating housing 26 further includes a plurality of cylindrical bores or chambers 42 in the rim 28 parallel to the axis 16. The chambers 42 are equally angularly spaced around the shaft 10 and are open at their opposite ends through respective ones of a pair of flat sides 44 A-B of the rim. The chambers 42 are surrounded by a pair of seal grooves 45 A-B in the flat sides 44 A-B, respectively.

Referring to FIGS. 1-4, respective ones of a plurality of impactors or damper weights 46 are disposed in corresponding ones of the chambers 42 and retained therein by a pair of rings 48 A-B bolted to flat sides 44 A-B, respectively, of the rim. A plurality of seals 49 in the grooves 45 A-B are captured by rings 48 A-B. Each impactor includes a cylindrical sleeve 50 the diameter of which is on the order of 0.015 inches less than the diameter of the corresponding chamber 42. Each sleeve 50 is closed at its opposite ends by a pair of caps 52 A-B.

Respective ones of a plurality of solid tungsten rods 54 are disposed in corresponding ones of the sleeves 50 between the caps 52 A-B. The diameters of the tungsten rods are on the order of 0.010 inches less than the diameters of the corresponding sleeves. A high temperature damping medium 56 fills the clearance between the tungsten rods 54 and the sleeves 50 in each impactor 46. The damping medium is liquid at the operating temperature of the damper 24 and may be oil for relatively low temperature applications and a low melting temperature metal such as lead for high temperature applications.

As the shaft 10 accelerates to a normal operating speed of on the order of 40,000 RPM, dynamic unbalance in the shaft and/or elements rotating therewith induces radial vibratory displacement of the shaft in the plane of the damper 24. Vibratory displacement of shaft 10, transferred to the floating housing 26 through the bearing 14, induces collisions or impacts between the impactors 46 and the chambers 42 which impacts initiate vibration damping energy absorption in two modes.

More particularly, the sleeves 50 stop moving when they impact the corresponding chambers 42. The tungsten rods 54, however, continue moving toward the sleeves and in so doing squeeze the damping medium from between the rods and the sleeves. By resisting being squeezed from between the tungsten rods and the sleeves, the damping medium absorbs energy and damps the radial vibratory displacement of the shaft 10 in one mode. After the oil is squeezed out, the tungsten rods 54 impact the sleeves 50 and, through the sleeves, the corresponding chambers 42. These impacts induce local plastic deformation of the rods and the chambers 42 which local plastic deformation absorbs additional energy and damps the radial vibratory displacement of the shaft 10 in another mode.

The damper 24 is useful in high and moderate temperature environments. For example, in moderate temperature environments characteristic of common squeeze film dampers, the damping medium 56 may be oil. The advantage in using the damper 24 with oil is the elimination of piping, seals and the like usually associated with conventional squeeze film dampers. In high temperature environments beyond the limits of common squeeze film dampers, the damping medium 56 may be a low melting temperature metal such as lead which liquefies within the sleeves 50 as the engine is started. The advantage in using a low melting temperature metal is the significantly higher maximum working temperature achievable. The damper 24 may also be useful in low or cryogenic temperature environments such as high-speed pumps in spacecraft propulsion systems which are below the operating temperature range of common oil film squeeze film dampers.

It will be apparent to those skilled in the art that a shaft vibration damper according to this invention could also be constructed for damping in only a single mode. That is, the impactors 46 could be solid so that the only mode of energy absorption is local plastic deformation of the impactors and the corresponding chambers 42 as described above.

We claim:

1. A vibration damper between a shaft rotatable about an axis of rotation and a relatively stationary structure comprising:
   a floating housing,
   means connecting said floating housing to said shaft for radial vibratory displacement a unit with said shaft in a plane perpendicular to said axis of rotation of said shaft,
   means connecting said floating housing to said stationary structure operative to accommodate radial vibratory displacement of said floating housing as a unit with said shaft,
   means defining a plurality of chambers in said floating housing arrayed symmetrically around said axis of rotation of said shaft, and
   a plurality of impactors disposed in respective ones of said chambers with predetermined clearance between each of said impactors and said corresponding one of said chambers so that said impactors collide with said corresponding chambers when said floating housing vibrates as a unit with said shaft.

2. The vibration damper recited in claim 1 wherein said means connecting said floating housing to said shaft includes:
   a bearing inner race rigidly attached to said shaft,
   a bearing outer race,
   a plurality of anti-friction elements between said inner and said outer bearing races, and
   means rigidly connecting said floating housing to said bearing outer race.

3. The vibration damper recited in claim 1 wherein:
   each of said chambers is a cylindrical bore in said floating housing having a first diameter and oriented parallel to said axis of rotation of said shaft, and
   each of said impactors is a metal cylinder having a second diameter less than said first diameter.

4. The vibration damper recited in claim 3 wherein each of said impactors includes:
   a cylindrical metal sleeve having an outside diameter equal to said second diameter, and
   a solid metal cylinder captured inside said sleeve having a diameter less than the inside diameter of said sleeve.

5. The vibration damper recited in claim 4 and further including:
   a damping medium filling each of said sleeves around said corresponding one of said metal cylinders therein liquid at the normal operating temperature of said damper.

6. The vibration damper recited in claim 5 wherein said damping medium is a low melting temperature metal for high temperature applications.

7. The vibration damper recited in claim 6 wherein said damping medium is lead.

* * * * *